(12) United States Patent
DeBoard et al.

(10) Patent No.: US 11,090,938 B1
(45) Date of Patent: Aug. 17, 2021

(54) MULTI-ARRAY EJECTION HEAD AND METHOD OF USE

(71) Applicant: Funai Electric Co., Ltd., Osaka (JP)

(72) Inventors: Bruce A. DeBoard, Lexington, KY (US); John Glenn Edelen, Lexington, KY (US); Michael A. Marra, III, Lexington, KY (US)

(73) Assignee: Funai Electric Co., Ltd.

( * ) Notice: Subject to any disclaimer, the term of this patent is extended or adjusted under 35 U.S.C. 154(b) by 0 days.

(21) Appl. No.: 16/875,232

(22) Filed: May 15, 2020

(51) Int. Cl.
*B41J 2/145* (2006.01)

(52) U.S. Cl.
CPC ..................... *B41J 2/145* (2013.01)

(58) Field of Classification Search
CPC ........................................ B41J 2/145
See application file for complete search history.

(56) References Cited

U.S. PATENT DOCUMENTS

| | | | |
|---|---|---|---|
| 6,228,659 B1 | 5/2001 | Kowallis et al. | |
| 7,396,511 B2 | 7/2008 | Fujii et al. | |
| 8,964,242 B2 * | 2/2015 | Kuno | G06K 15/105 358/1.8 |
| 9,050,592 B2 | 6/2015 | Still et al. | |
| 2005/0118074 A1 | 6/2005 | Hubbard et al. | |
| 2019/0083972 A1 | 3/2019 | Nielsen et al. | |

* cited by examiner

*Primary Examiner* — Lamson D Nguyen
(74) *Attorney, Agent, or Firm* — Luedeka Neely Group, PC (57) ABSTRACT

A digital dispense device and method for ejecting one or more fluids into a target area of a substrate. The digital dispense device includes (A) a fluid ejection head for the digital dispense device having one or more arrays of fluid ejectors thereon; (B) a fluid ejection head translation device for moving the ejection head over the target area of the substrate in a first direction, wherein the one or more arrays of fluid ejectors on the fluid ejection head are oriented parallel to the first direction; and (C) a control device for activating one or more fluid ejectors in the one or more arrays of fluid ejectors as the one or more fluid ejectors intersect the target area of the substrate.

20 Claims, 8 Drawing Sheets

MULTI-ARRAY EJECTION HEAD AND METHOD OF USE

TECHNICAL FIELD

The disclosure is directed to devices and methods that are used to accurately dispense one or more fluids onto or into precise areas of a substrate for performing analysis of samples confined to the precise areas of the substrate or for building up layers of material in predetermined areas on the substrate.

BACKGROUND AND SUMMARY

Figure 1:
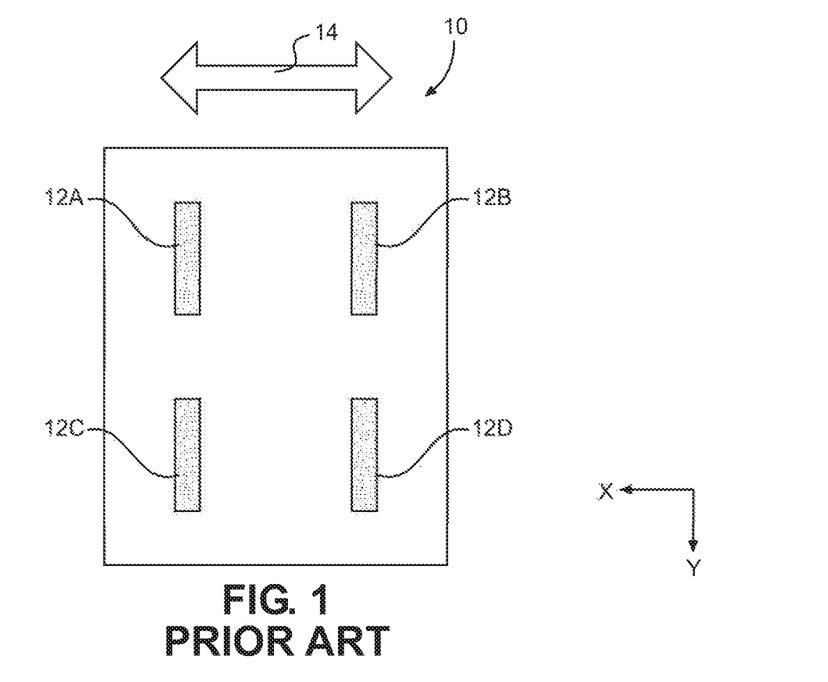
FIG. 1 is a plan view, not to scale, of a prior art ejection head showing an arrangement of fluid ejector arrays thereon.

A device such as an inkjet device, can dispense very small droplets of ink, usually measured in picoliters onto a substrate. For inkjet printing applications, the volume of ink that is deposited is a relatively low amount, and the volume is not as important as other factors such as color matching and print quality. A typical inkjet printer is limited to the deposition of about 2 to about 3 µL/cm². A typical inkjet printhead may have one or more fluid supply vias each associated with a different color ejection head wherein the ejection heads may be provided on a single substrate as shown in FIG. 1 or on multiple substrates. Locating the ejection heads on a single substrate has an advantage of reducing the cost of the ejection head. A typical printhead 10 for an inkjet printer has arrays of fluid ejectors 12a-12d that are oriented in a y direction perpendicular to a direction of travel of the printhead 10 in the x direction as indicated by arrow 14.

However, for other applications that require accurate amounts of liquid to be dispensed onto or into a medium, fluid volume is an extremely important and/or a critical factor. For some application, it may be advantageous to specify that a volume of fluid is deposited into or over a specific area. An example may be the dispensing of a single drop of fluid containing a single cell into a well of a micro-well plate. Another example may be dispensing a large number of fluid droplets into a small areas such as filling each of 384 wells in a micro-well plate. Accordingly, the density of fluid deposited into the wells of a well plate may require the dispensing of more than 250 µL/cm² of fluid. Likewise, depositing fluid onto a glass slide for analyzing a sample on the glass slide requires that a closely controlled amount of fluid is deposited over a specific area of the glass slide.

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting is often performed manually or using expensive lab equipment. In some cases, the wells are filled with hand operated pipettes. In other cases, high-end automated devices based on pipette technology are used to fill the well plates. Such automated devices accommodate an open well dispense head only. The open well dispense head is a dispense head where a small amount of fluid must be deposited into an opening in the dispense head before use. The fluid is typically deposited manually using a pipette or similar means. The dispense head is held stationary while moving the micro-well plate in both X and Y directions. These high end devices are extremely expensive.

In the areas of micro-circuit manufacture, fluids are required to be dispensed in precise locations to provide circuit devices on a substrate. The volume of fluid dispensed per unit area is typically much greater than can be provided by conventional ink jet printing technology. In some cases, different fluids are combined together on the substrate to provide a chemical or physical change to the fluids so that the resulting material performs a desired circuit function.

Other areas of micro-manufacturing may also require the precise deposit of fluids into or onto a substrate. There is thus the need for a method and device that can be used to dispense a predetermine volume of one or more fluids per unit area of a substrate.

Figure 2:
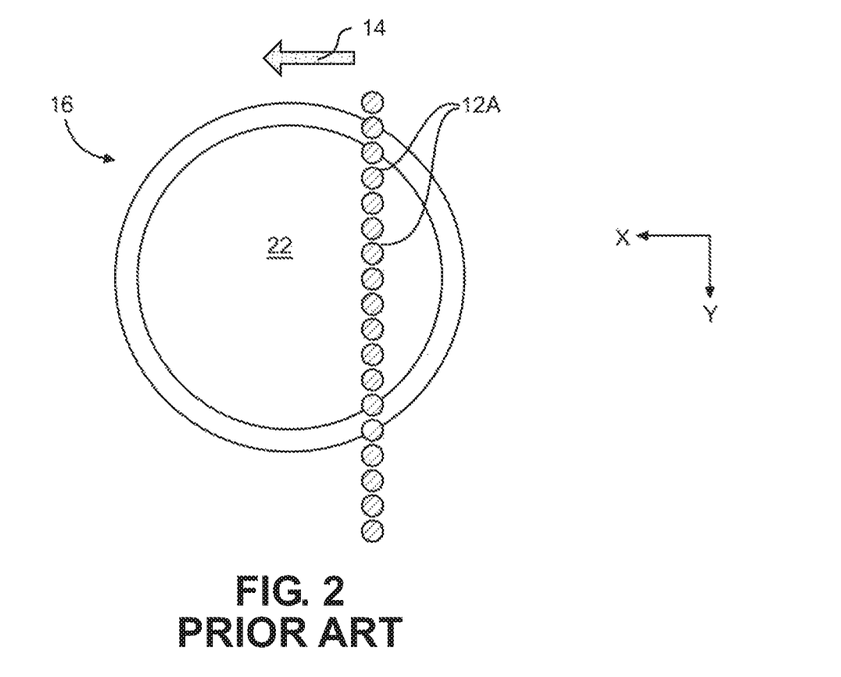
FIG. 2 is a plan view, not to scale of a prior art ejector array of the ejection head of FIG. 1 passing over a target area of a substrate.
Figure 3:
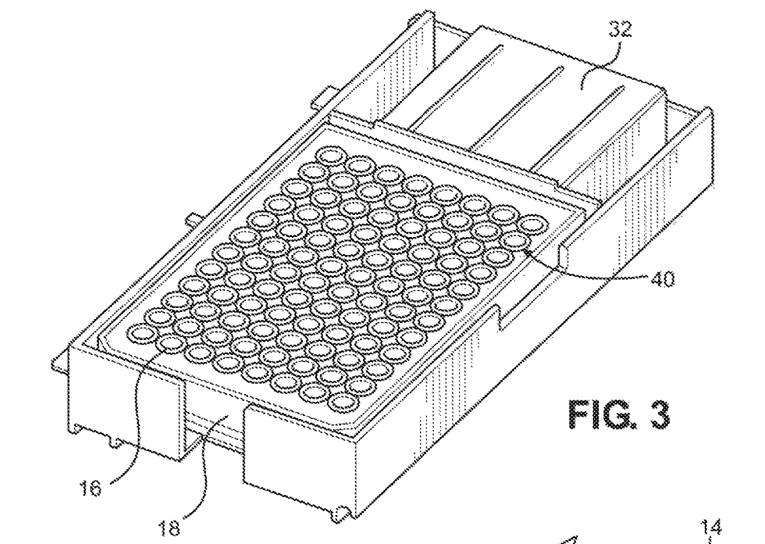
FIG. 3 is a perspective view, not to scale, of a micro-well plate in a tray for use with a digital dispense device according to the disclosure.
Figure 4:
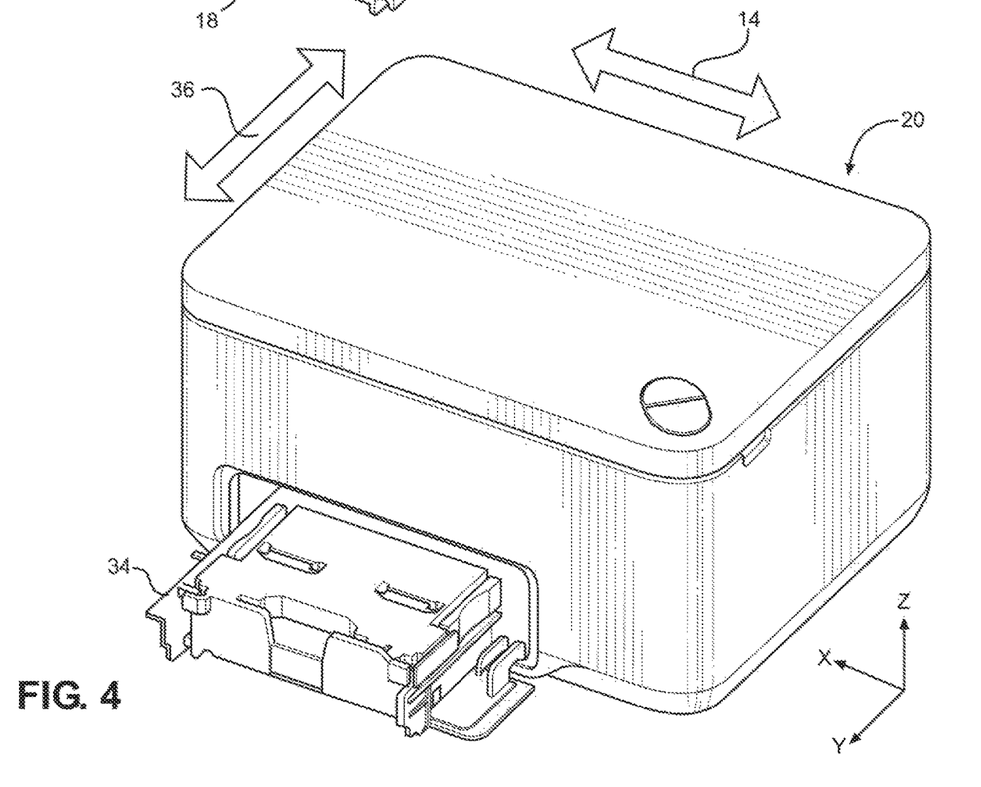
FIG. 4 is a perspective view, not to scale, of a digital dispense device according to the disclosure.

FIG. 2 represents a single well 16 of a micro-well plate 18 (FIG. 3) that is used with a digital dispense device 20 (FIG. 4). When an array of fluid ejectors 12a of the printhead 10 is oriented perpendicular to the direction of travel of the printhead 10, a portion of the fluid ejectors 12a will be outside of a target area 22 of the well 16 and thus will not be used to eject fluid into the well 16. Fluid ejectors in the ejector array 12a that are idle may misfire due to fluid drying out on the printhead 10 adjacent to the idle fluid ejectors. Also, fluid ejectors in the ejector array 12a that are too close to the sidewalls of the well 16 may cause fluid splashing out of the target area if used during a pass of the ejector array 12a over the well 16.

Using the conventional printhead 10 may be an effective way to fill a well 16 of a micro-well plate, however many passes of the printhead 10 may be required to achieve a large dispense volume of fluid. For example, a 100 nozzle array of a conventional printhead printing at a resolution of 1200×1200 drops per inch (dpi) can generate a square with 10,000 drops, or a circle with around 7,853 drops. If a drop size of 10 picoliters (pL) is used, then the square will contain 100,000 pL (0.1 microliters) and the circle will contain 0.079 microliters. In order to achieve a volume of 1 microliter, 10 repeat passes of the printhead 10 will be required for the square, and more passes than that will be required for the circular example. What is needed therefore is a system and method for depositing relatively large volumes of fluids in a target area with greater accuracy and speed.

Accordingly, an embodiment of the disclosure provides a digital dispense device for ejecting one or more fluids into a target area of a substrate. The digital dispense device includes (A) a fluid ejection head for the digital dispense device having one or more arrays of fluid ejectors thereon; (B) a fluid ejection head translation device for moving the ejection head over the target area of the substrate in a first direction, wherein the one or more arrays of fluid ejectors on the fluid ejection head are oriented parallel to the first direction; and (C) a control device for activating one or more fluid ejectors in the one or more arrays of fluid ejectors as the one or more fluid ejectors intersect the target area of the substrate.

Another embodiment of the disclosure provides a method for dispensing a predetermined amount of fluid into a target area of a substrate. The method includes providing a digital dispense device. The digital dispense device contains (A) a fluid ejection head for the digital dispense device having one or more arrays of fluid ejectors thereon; (B) a fluid ejection head translation device for moving the ejection head over the target area of the substrate in a first direction, wherein the one or more arrays of fluid ejectors on the fluid ejection head are oriented parallel to the first direction; and (C) a control device for activating one or more fluid ejectors in the one or more arrays of fluid ejectors as the one or more fluid ejectors intersect the target area of the substrate. The fluid ejection head is moved over the target area of the substrate while activating one or more fluid ejectors to eject fluid into the target area until a predetermined amount of fluid is deposited in the target area.

In some embodiments, the fluid ejection head contains two arrays of fluid ejectors thereon. In other embodiments, the fluid ejection head contains three arrays of fluid ejectors thereon. In still other embodiments, the fluid ejection head contains four arrays of fluid ejectors thereon.

In some embodiments, the fluid ejection head contains four arrays of fluid ejectors thereon and the four arrays of fluid ejectors are arranged in a two-dimensional matrix.

In some embodiments, the target area of a well of a micro-well plate is 5 to 50% less than a total open area of the well of the micro-well plate.

In some embodiments, the each array of the one or more arrays of fluid ejectors spans more than one well of a micro-well plate. In other embodiments, each array of the one or more arrays of fluid ejectors has a span greater than the target area.

In some embodiments, the fluid dispense system includes a substrate translation mechanism for moving the substrate in a second direction perpendicular to the first direction. In other embodiments, the substrate is indexed in the second direction after the fluid ejector head has traversed the substrate a predetermined number of times.

In some embodiments, fluid is ejected only along a centerline of the target area. In other embodiments, the fluid ejectors are activated only in a portion of the target area that results in reduced fluid splattering outside of the target area.

In some embodiments, all of the fluid ejectors in the one or more arrays of fluid ejectors are activated at least once as the one or more arrays of fluid ejectors pass over the target area.

In some embodiments, a minimum velocity for movement of the ejection head over the target area is used and maximum frequency for activating the one or more fluid ejectors is used to thereby eject a maximum amount of fluid in the target area.

The device and method described herein improve the speed by which a precise amount of the one or more fluids is dispensed in a predetermined area of a substrate. Thus, the system and method may be used for performing analysis of samples and for micro-manufacturing of electrical and other devices.

DETAILED DESCRIPTION OF EMBODIMENTS OF THE DISCLOSURE

In contrast to convention inkjet printing devices, the disclosed embodiments provide a unique fluid ejection head for dispensing a predetermined amount of fluid into a target area as described in more detail below. One application of the fluid ejection head is the deposition of fluids onto a substrate such as into wells 16 of the micro-well plate 18 (FIG. 3) using a digital dispense device 20. For purposes of this disclosure, the substrate described herein is the micro-well plate 18. However, the devices and methods described herein may be applied to the deposition of fluids onto any suitable substrate including, but not limited to, glass slides, circuit boards, and the like.

Figure 5:
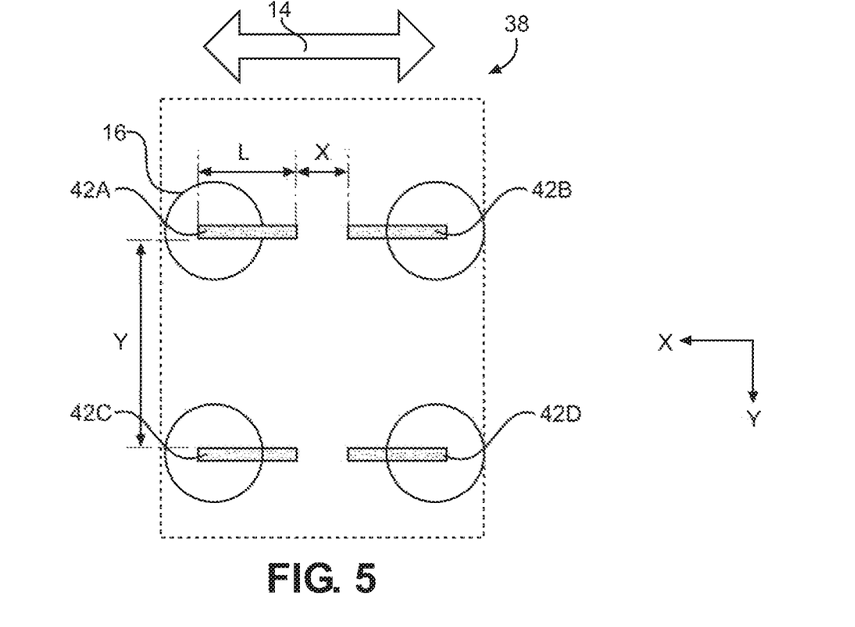
FIG. 5 is a plan view, not to scale, of an ejection head according to the disclosure showing an arrangement of fluid ejector arrays thereon.
Figure 6:
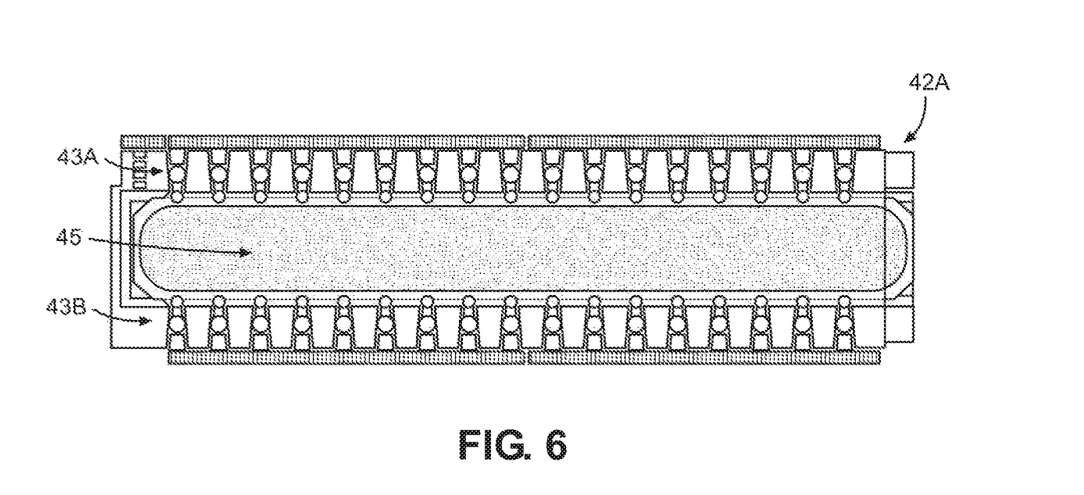
FIG. 6 is a plan close-up view, not to scale, of a single ejector array for the ejection head according to the disclosure.

As a tray 32 holding the well plate 18 is moved by a translation mechanism 34 through the digital dispense device 20 in a y direction as indicated by arrow 36, a fluid ejection head 38 (FIG. 5), according to an embodiment of the disclosure, moves in the x direction as indicated by arrow 14 which is orthogonal to y direction so that fluid can be dispensed into the wells 16 in each row 40 of the micro-well plate 18. Unlike the conventional printhead of FIG. 1, the fluid ejection head 38 according to the disclosure has ejector arrays 42a-42d disposed parallel to the x direction of travel of the fluid ejection head 38. Also, ejector arrays 42a-42c and 42b-42d are spaced-apart a distance Y ranging from about 4 to about 5 mm that corresponds to the centerline of each well 16. Likewise, each ejector array 42a-42b and 42c-42d is spaced-apart a distance X that may range from about 1000 to about 1100 µm and each ejector array 42a-42d has a length L ranging from about 1800 to about 2000 µm. In other embodiment, the length L of each ejector array 42a-42d may be greater than the diameter of each well 16. FIG. 6 is a close-up view off an ejector array 42a containing two columns of fluid ejection nozzles 43a and 43b disposed on opposite sides of a fluid supply via 45.

When the ejector array of the fluid ejection head 38 is larger than the diameter of the wells 16 or a predetermined target area for fluid deposition, only select portions of the ejector arrays 42a-42d will be activated to deposit fluid into the well 16. FIG. 6 illustrates a sequence for activating groups of fluid ejectors defined by primitives P1-P4 in the ejector array 42a as the fluid ejection head 38 moves in the direction of arrow 14 across a single well 16. In the first step 1 of the sequence only the fluid ejectors in primitive P1 are activated to deposit fluid into well 16, In the second step 2 of the sequence, the fluid ejectors in primitives P1 and P2 are activated. In the third step 3 of the sequence, the fluid ejectors in primitives P1, P2 and P3 are activated. As the fluid ejection head 38 continues to move in the direction of arrow 14, as shown in step 4, only the fluid ejectors in primitives P2 and P3 are activated. In step 5 of the sequence, the fluid ejectors in primitives P2, P3 and P4 are activated, and in step 6, the fluid ejectors in primitives P3 and P4 are activated. The fluid ejectors in each of the primitives P1, P2, and P3 may be activated sequentially or randomly as fluid ejection head 38 moves over the target area.

In order to improve the accuracy and speed of depositing fluid in the predetermined target area or receptacle of a substrate, the following assumptions for a single array of fluid ejectors is provided:

1. The target output volume in the target area of a substrate is $V_{target}$.
2. The speed limits of the fluid ejection head (minimum and maximum) are $S_{max}$ and $S_{min}$.
3. The drop size produced by each fluid ejector in the ejector array is $V_{drop}$.
4. The number of fluid ejectors in the ejector array is N.
5. The receptacle diameter or width of the receptacle in the target area is $D_t$.
6. The maximum jetting frequency for the fluid ejector array and fluid being ejected is $F_{max}$.

Figure 7:
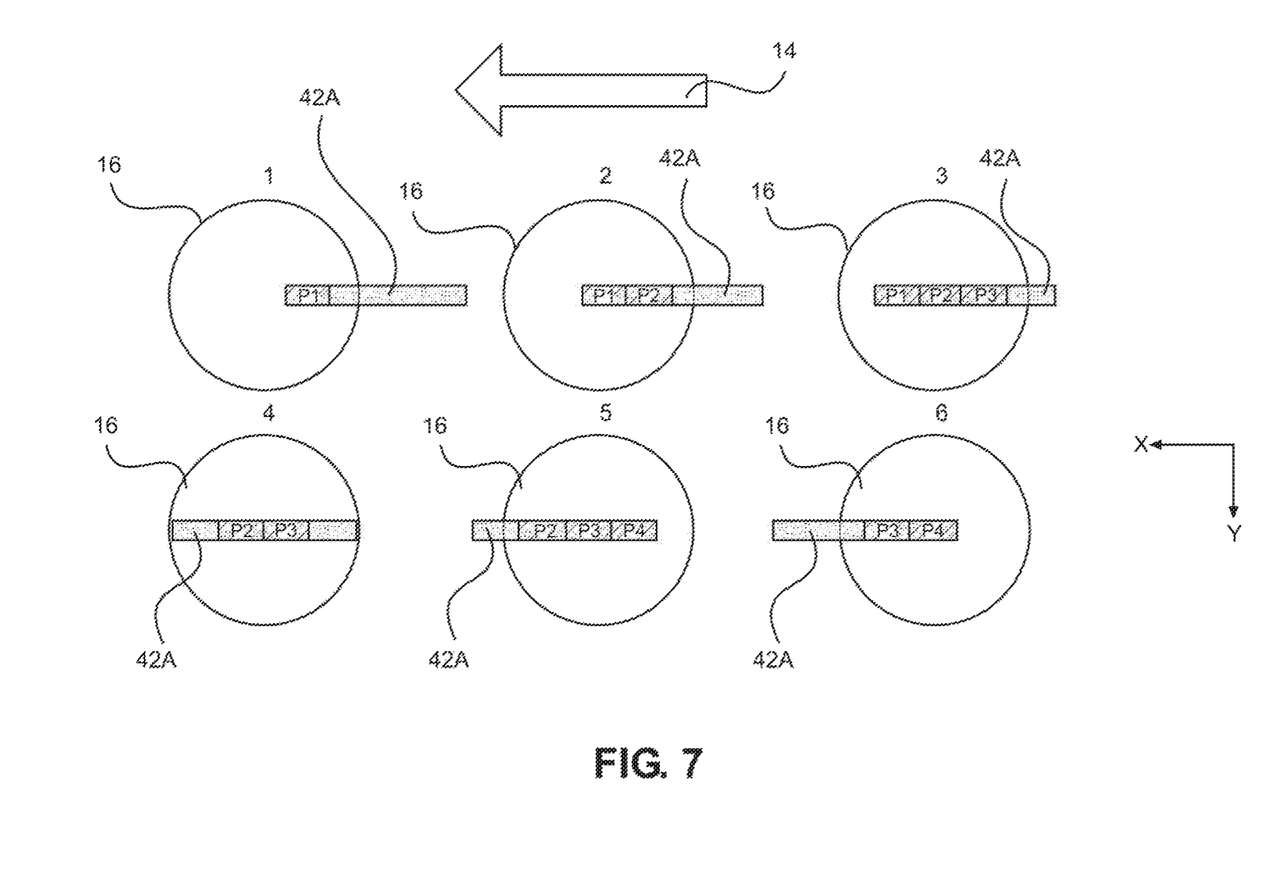
FIG. 7 is a plan view, not to scale, illustrating the activation of an ejector array of the ejection head of FIG. 5 as the ejector array passes over a single well of a well plate.

Once the fluid ejection head 38 is in motion, each fluid ejector in the array will transverse the target area or receptacle. For a single ejector array dispensing fluid, the array is positioned so that it crosses the full diameter of the well 16 in the case of a circular well. If the receptacle 50 is rectangular (FIG. 7), then positioning of the ejector array is less critical, but targeting the central area 52 of the rectangular receptacle 50 is still the best practice. However, due to positioning accuracy of the ejector array as well as fluid jetting misdirection and potential satellite deposition of fluid, the target area 52 of the receptacle 50 will be smaller than the actual receptacle 50. The target area depends on the device accuracy as well as the ejector array's accuracy. Likewise, for a circular receptacle 54, the target area 56 will be smaller than the receptacle 54.

As the ejector array moves relative to the receptacle 50 or 54, fluid ejectors according to the primitives described above will enter the target area 52 or 56 one by one, and later leave the target area one by one, in a "first in first out" manner. Considering just one fluid ejector in the nozzle array, the number of fluid droplets the fluid ejector can dispense at a specific frequency can be calculated. In order to calculate the number of fluid droplets per fluid ejector, the velocity of the fluid ejection head 38 is set to $S_{min}$ because the minimum velocity of the fluid ejection head 38 will produce the greatest volume output of fluid. The jetting frequency is set to the maximum frequency $F_{max}$ since this also produces the greatest volume output of fluid. The number of fluid droplets per fluid ejector is calculated by the formula:

$$DropletsPerFluidEjector = F_{max} * D_t / S_{min}.$$

For example, if the target diameter is 4 mm, the maximum jetting frequency is 18 Khz, and the minimum speed of the fluid ejection head 38 is 25.4 mm/sec, one fluid ejector in the ejector array will dispense 18,000*4/25.4=2835 fluid droplets.

Since each fluid ejector in our ejector array will take the same path across the receptacle, the total fluid droplets over the entire ejector array can be calculated by the formula:

$$TotalFluidDroplets = DropletsPerFluidEjector * N.$$

For example, if there are 100 fluid ejectors in each ejector array, then the total droplets per ejector array will be 2835*100=283,500 droplets of fluid.

Each droplet will contain a certain volume of fluid, so the dispensed volume of fluid can be calculated by the formula:

$$VolumeDispensed = Droplets\ Total * V_{drop}.$$

For example, if each fluid ejector in the ejector array ejects droplets of 10 picoliters (pL), then the total volume dispensed is 283,500*10 pL=2,835,000 pL or 2.835 (µL) of fluid.

If we assume that the optimal jetting frequency $F_o$ is also the maximum frequency (at least for the moment), then the calculation above represents the maximum fluid volume that can be dispensed in one pass of the fluid ejection head 38 over the receptacle 50 or 54. If the target volume is larger than the maximum volume, then multiple passes of the fluid ejection head 38 over the receptacle will be required, since the fluid ejection head is already moving at the lowest speed the device can provide.

If the target volume is lower than the maximum volume output of the ejector array, then a maximum speed for the fluid ejection head using the first equation according to the formula is as follows:

$$S_{opt} = F_{max} * D_t / DropletsPerFluidEjector.$$

For a lower value for DropletsPerFluidEjector, the equation becomes $$DropletsPerFluidEjector = Target\ Volume(droplets) / N$$

where $$Target\ Volume(droplets) = V_{target} / V_{droplet}.$$

So, after substituting variables, the equation for the optimum fluid ejection head speed $S_{opt}$ becomes:

$$S_{opt} = F_{max} * D_t / ((V_{target} / V_{droplet}) / N)$$

A simpler equation that only uses the ratio of $V_{max}$ to $V_{target}$ can be used as follows:

$$S_o = S_{min} * V_{max} / V_{target}$$

where $S_o$ is the calculated speed of the fluid ejection head.

Using the previous example values with a target volume of 1.0 uL (1000000 pL):

$$S_{opt} = 18,000\ hz * 4\ mm / ((1000000/10)/100) = 72\ mm/sec.$$

Or with the simpler equation:

$$S_o = 25.4\ mm/sec * 2.835\ \mu L / 1.0\ \mu L = 72\ mm/sec.$$

Accordingly, the fluid ejection head or fluid ejector array can move at 72 mm/sec and still achieve the target volume.

However, if the calculated speed of the fluid ejection head exceeds $S_{max}$, then several things can be done to compensate for the slower speed of the fluid ejection head. First, the fluid ejection frequency can be reduced using $S_{max}$ as the speed of the fluid ejection head and recalculating the fluid ejection frequency to use in the equations rather than the maximum fluid ejection frequency. It is desirable, however, a fluid ejection frequency that will work with the device is determined by selecting a frequency from the closest match of fluid ejection frequencies to the calculated frequency and modifying the speed to compensate for the fluid ejection frequency.

A second option would be to reduce the target diameter or area. By reducing the target diameter or area, the same calculated speed and optimal fluid ejection frequency can be used thereby delivering the correct volume of fluid to the receptacle.

A third option would be to reduce the number of fluid ejectors in the nozzle array that are used. This third option would provide a similar outcome to second option without reducing the target diameter or area. The disadvantage of the third option is that some of the fluid ejectors would be idle and thus may require additional cleaning or maintenance before use for the next fluid ejection job.

The equation for reducing the fluid ejection frequency may be calculated using the Droplets Per Fluid Ejector equation above and solving for the new frequency as follows:

$$F_{new} = \text{DropletsPerFluidEjector} * S_{max}/D_t.$$

As before Droplets Per Fluid Ejector is now a value associated with the target volume rather than a maximum volume according to the equation:

$$\text{DropletsPerFluidEjector} = \text{Target Volume(Droplets)}/N$$

where $$\text{TargetVolume(Droplets)} = V_{target}/V_{droplet}$$

so:

$$F_{new} = ((V_{target}/V_{droplet})/N) * (S_{max}/D_t).$$

Alternatively, the same answer can be obtained by using a ratio of the max speed to the calculated speed as follows:

$$F_{new} = F_{max} * S_{max}/S_o,$$

wherein $S_o$ is the uncapped calculated fluid ejection head speed from the previous fluid ejection head speed calculation.

A reduced target diameter can be calculated using the following formula:

$$D_{new} = \text{DropletsPerFluidEjector} * S_{max}/F_{max}$$

whereas before, $\text{DropsPerFluidEjector} = (V_{target}/V_{drop})/N$.

The known volumes can be used in the following equation:

$$D_{new} = ((V_{target}/V_{droplet})/N) * S_{max}/F_{max}.$$

Or the ratio of max speed to calculated speed can be used as follows:

$$D_{new} = D_t * S_{max}/S_o$$

to get the same result.

Figure 8:
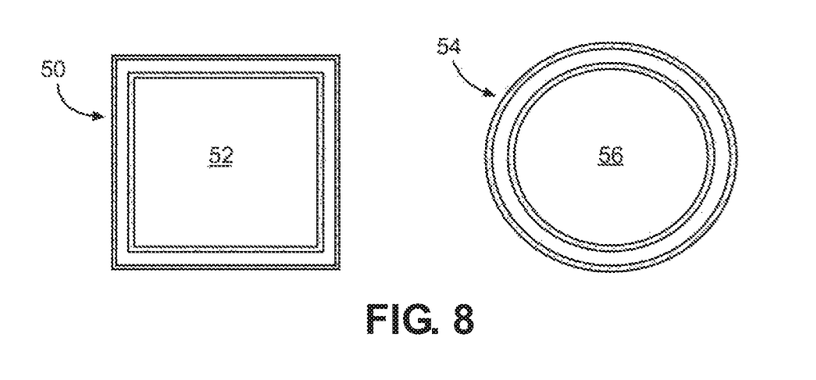
FIG. 8 is a schematic illustration, not to scale, of target areas of rectangular and circular receptacles for depositing fluid therein.

So far only one receptacle has been considered, however, there may be many receptacles in a row to fill with fluid, and based on the ejector array length L and receptacle diameter, there could be more than one receptacle 50a-50c filling at the same time, as shown by the hashed circles in FIG. 8. In this scenario, the fluid ejection head speed is limited by the receptacle 50a that requires the lowest fluid ejection head speed for filling with fluid.

Figure 9:
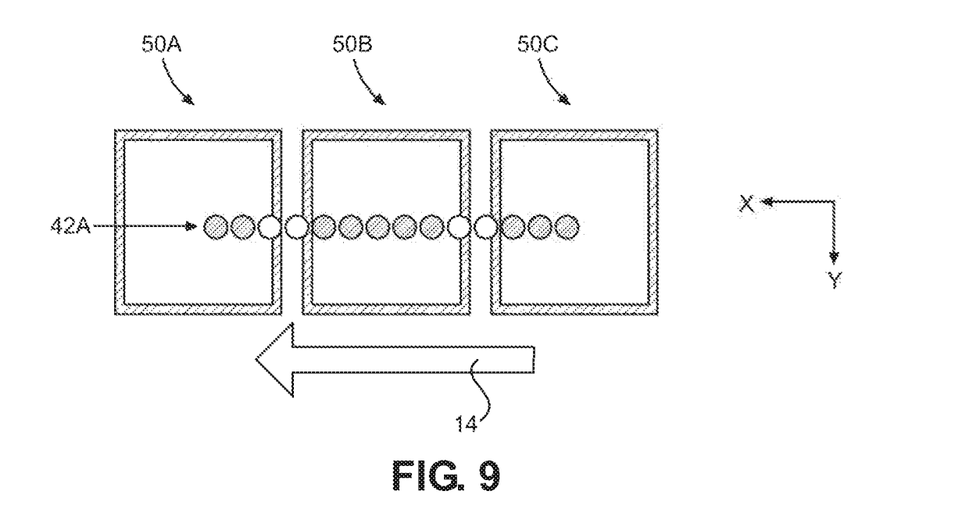
FIG. 9 is a schematic view, not to scale, of an ejector array of the ejection head of FIG. 5 spanning several rectangular receptacles of a substrate.

For the other receptacles, a method such as changing the frequency or target diameter to account for the difference in fluid ejection head speed may be used to compensate for the slower fluid ejection head speed. If the device can deliver different frequencies to each fluid ejector, modifying the frequency would be the best choice. However, if changing the fluid ejection frequency to individual fluid ejectors is not possible, reducing the target diameter of the receptacles 50a-50c as shown in FIG. 9 may be a suitable choice that will work in most cases.

Figure 10:
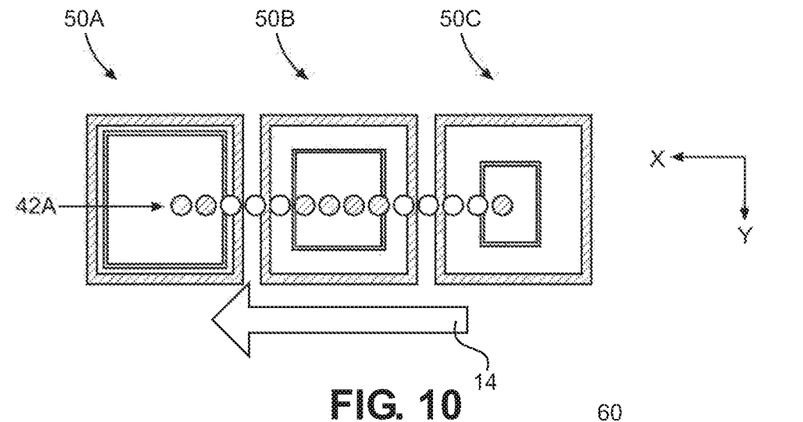
FIG. 10 is a schematic view, not to scale, of an ejector array of the ejection head of FIG. 5 spanning several rectangular receptacles of a substrate having different sized target areas.

In some embodiments, the fluid ejection head 38 may include a matrix of ejector arrays 42a-42d that provide ejection of a different fluid for each ejector array. In other embodiments, the digital dispense device 20 may include multiple fluid cartridges, wherein each cartridge dispenses a different fluid through the fluid ejection head 38. Accordingly, with each pass over the substrate, a different fluid may be dispensed. In the embodiment wherein the fluid ejection head 38 has a matrix of ejector arrays 42a-42d that each dispense a different fluid, and all of the ejector arrays 42a-42d fit within a target area of the receptacle 60 (FIG. 10), a different fluid may be dispensed in each of the areas 62a-62c of the receptacle. If each ejector array has a different target volume, the target volume can be adjusted by changing the fluid ejection frequency or by specifying a different target volume for each ejector array.

Figure 11:
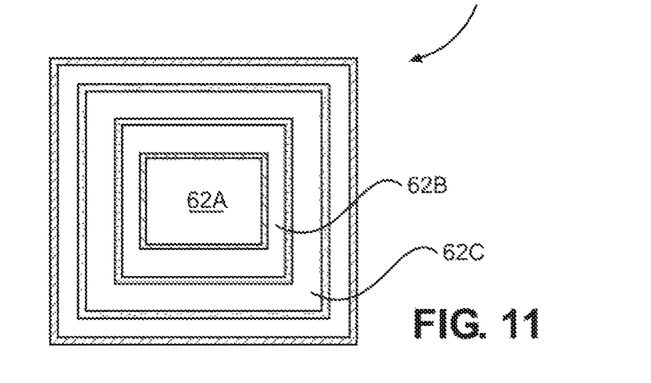
FIG. 11 is a schematic view, not to scale, of a rectangular receptacle having several target areas for different fluids.
Figure 12:
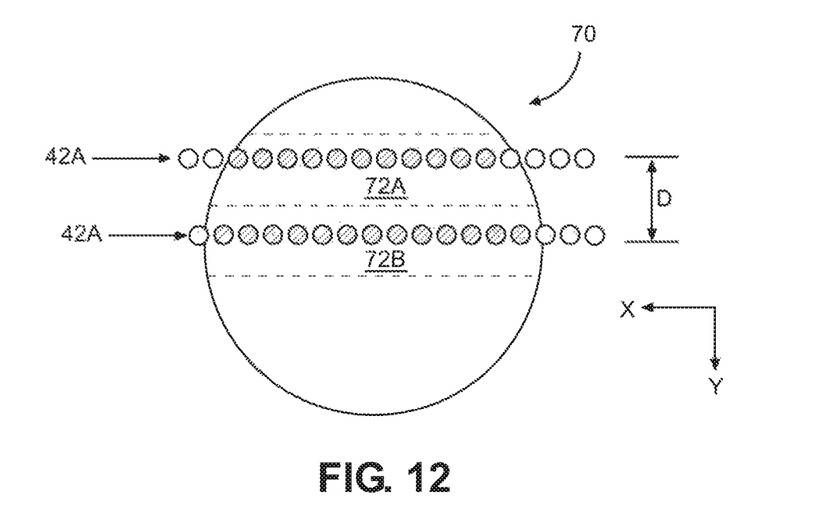
FIGS. 12 and 13 are schematic view, not to scale, of circular receptacles wherein two fluid ejector arrays span different target areas of the receptacles.
Figure 13:
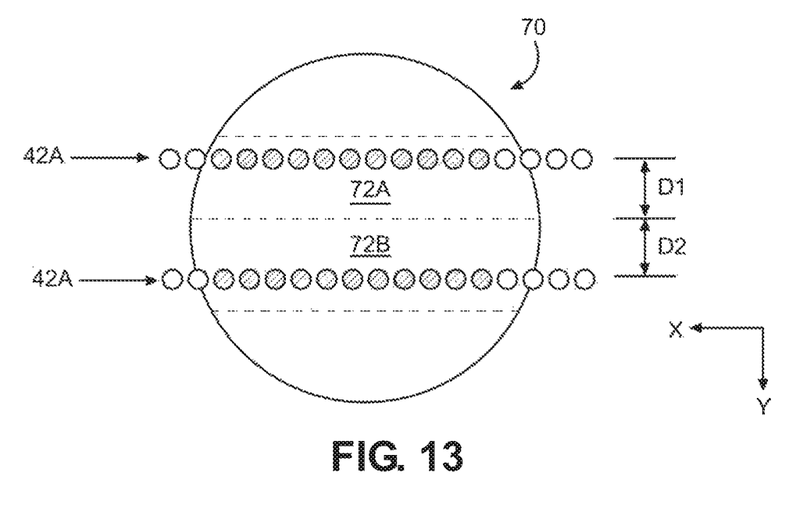

If the receptacle is circular however, it becomes slightly more difficult to place multiple ejector arrays within the target area. FIG. 11, illustrates a circular receptacle 70 having target areas 72a and 72b for two different fluids. Fluid ejector array 42b can be lined up with the central portion 72b of the receptacle 70. However, the target area 72a for ejector array 42a is not as simple. Geometrically, the fluid dispense length for ejector array 42a is defined by a chord of the circular receptacle. If the diameter of the receptacle is known and the distance (d) between ejector arrays 42a and 42b is known, then the fluid dispense length can be calculated by the formula:

$$\text{FluidDispenseLength} = 2 * \sqrt{(r^2 - d^2)}$$

Where r is the radius of the receptacle and d is the distance between the centerline of the receptacle and the centerline of ejector array 42a wherein ejector array 42b is aligned with the centerline of the receptacle 70. However, it may be advantageous to have an alignment of ejector arrays 42a and 42b more like FIG. 12. In FIG. 12, the ejector arrays 42a and 42b are equally offset from the center wherein d1=d2.

As described above, the ejector arrays 42a and 42b may span more than one receptacle and that can also be a factor in how the ejector arrays are aligned with the receptacles. For example, the ejector arrays 42a-42c may be aligned with two receptacles 80 and 90 to fill target areas 82a, 92a and 92b as shown.

Figure 14:
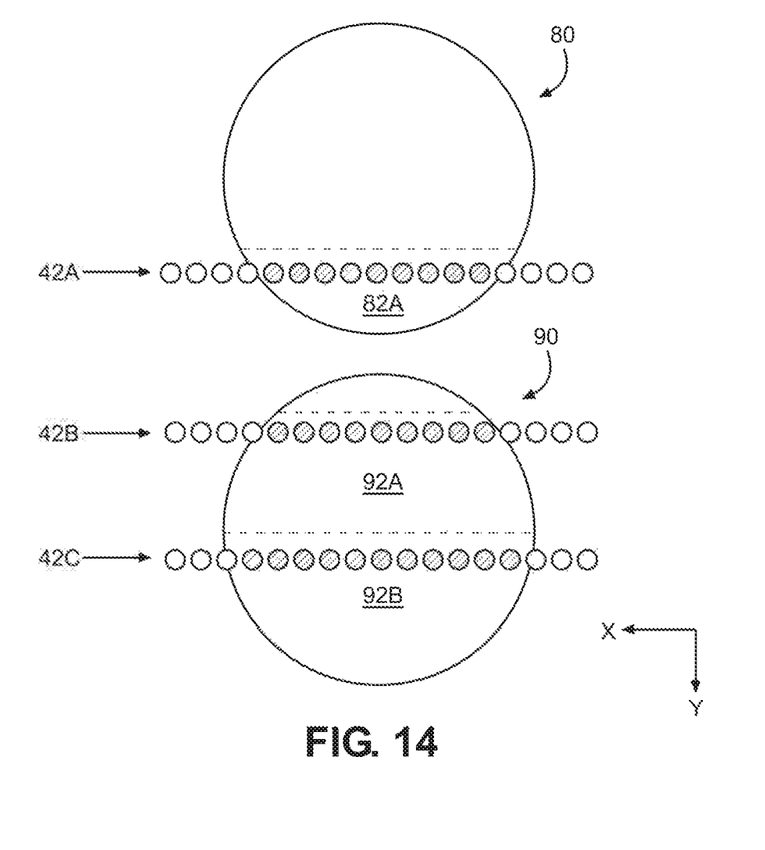
FIG. 14 is a schematic view, not to scale, wherein three fluid ejector arrays span two different circular receptacles having specified target areas.
Figure 15:
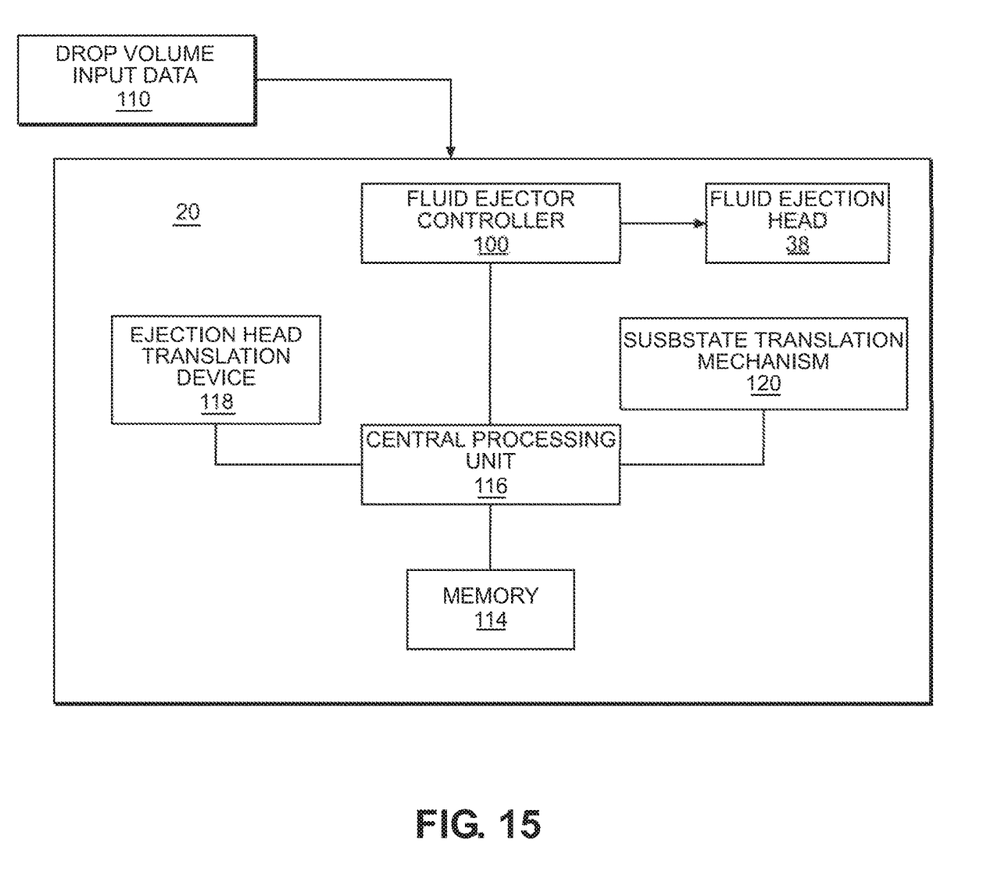
FIG. 15, is a schematic drawing of fluid ejection controller in the digital dispense device of FIG. 4.

FIG. 14 is a schematic drawing of the fluid ejector controller 100 that is used to control the fluid ejectors on the ejection head 38. Droplet volume input data 112 is input to the digital dispense device 20. The droplet volume date 112 may be stored in a memory 114 for use by a central processing unit 116 of the device 20 to control the fluid ejection head translation device 118, the substrate translation mechanism 120, and the amount of fluid dispensed by the fluid ejection head 38.

The foregoing methods provide benefits over conventional printhead which have ejector arrays disposed perpendicular to the direction of travel of the printhead over a substrate. The foregoing methods may be used to spread the volume of fluid to be dispensed over multiple fluid ejection head passes and multiple fluid ejectors along an ejector array of the fluid ejection head. This will minimize the impact of missing or poorly performing fluid ejectors. Depending on the desired dispense accuracy and probability of ejectors not functioning correctly, a minimum number of fluid ejectors to use can be specified or calculated.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A digital dispense device for ejecting one or more fluids into a target area of a substrate, the digital dispense device comprising;
    A) a fluid ejection head for the digital dispense device having a linear array of fluid ejectors thereon, wherein the fluid ejectors are grouped by primitives from a first end of the linear array to a second end of the linear array;
    B) a fluid ejection head translation device for moving the ejection head over the target area of the substrate in a first direction, wherein the linear array of fluid ejectors on the fluid ejection head are oriented parallel to the first direction; and
    C) a control device for sequentially activating all of the primitives of fluid ejectors in the linear array of fluid ejectors as the linear array of fluid ejectors intersects the target area of the substrate.

2. The fluid dispense system of claim 1, wherein the fluid ejection head comprises two linear arrays of fluid ejectors thereon.

3. The fluid dispense system of claim 1, wherein the fluid ejection head comprises three linear arrays of fluid ejectors thereon.

4. The fluid dispense system of claim 1, wherein the fluid ejection head comprises four linear arrays of fluid ejectors thereon, wherein each linear array of fluid ejectors comprises two columns of fluid ejection nozzles disposed on opposing sides of a fluid supply via.

5. The fluid dispense system of claim 4, wherein the four linear arrays of fluid ejectors are arranged in a two-dimensional matrix, wherein adjacent linear arrays are spaced apart a distance of about 4.5 mm perpendicular to the first direction.

6. The fluid dispense system of claim 1, wherein the target area of a well of a micro-well plate is 5 to 50% less than a total open area of the well of the micro-well plate.

7. The fluid dispense system of claim 1, wherein the linear array of fluid ejectors spans more than one well of a micro-well plate.

8. The fluid dispense system of claim 1, wherein the linear array of fluid ejectors has a span greater than the target area.

9. The fluid dispense system of claim 1, further comprising a substrate translation mechanism for moving the substrate in a second direction perpendicular to the first direction.

10. A method for dispensing a predetermined amount of fluid into a target area of a substrate, comprising:
    providing a digital dispense device, the digital dispense device comprising;
        A) a fluid ejection head for the digital dispense device having a linear array of fluid ejectors thereon, wherein the fluid ejectors are grouped by primitives from a first end of the linear array to a second end of the linear array;
        B) a fluid ejection head translation device for moving the ejection head over the target area of the substrate in a first direction, wherein the linear array of fluid ejectors on the fluid ejection head are oriented parallel to the first direction; and
        C) a control device for sequentially activating all of the primitives of fluid ejectors in the linear array of fluid ejectors as the linear array of fluid ejectors intersects the target area of the substrate;
    moving the fluid ejection head over the target area of the substrate while activating one or more primitives of fluid ejectors to eject fluid into the target area until a predetermined amount of fluid is deposited in the target area.

11. The method of claim 10, wherein fluid is ejected only along a centerline of the target area.

12. The method of claim 10, wherein the primitives of fluid ejectors are activated only in a portion of the target area that reduces fluid splattering outside of the target area.

13. The method of claim 10, wherein all of the fluid ejectors in the linear array of fluid ejectors are activated at least once as the primitives of fluid ejectors pass over the target area.

14. The method of claim 10, wherein the digital dispense device comprises a substrate translation mechanism for moving the substrate in a second direction perpendicular to the first direction, further comprising indexing the substrate in the second direction after the fluid ejection head has traversed the substrate a predetermined number of times.

15. The method of claim 10, further comprising:
    setting a minimum velocity for movement of the ejection head over the target area; and
    setting a maximum frequency for activating the one or more fluid ejectors, thereby ejecting a maximum amount of fluid in the target area.

16. A fluid ejection head for a digital dispense device, the fluid ejection head comprising a linear array of fluid ejectors thereon, wherein the fluid ejectors are grouped by primitives from a first end of the linear array to a second end of the linear array and wherein the linear array of fluid ejectors on the fluid ejection head is oriented parallel to a direction of travel of the fluid ejection head in the digital dispense device, for sequential activation of the primitives of fluid ejectors over a target area.

17. The fluid ejection head of claim 16, wherein the fluid ejection head comprises two linear arrays of fluid ejectors thereon.

18. The fluid ejection head of claim 16, wherein the fluid ejection head comprises three linear arrays of fluid ejectors thereon.

19. The fluid ejection head of claim 16, wherein the fluid ejection head comprises four linear arrays of fluid ejectors thereon.

20. The fluid ejection head of claim 19, wherein the four linear arrays of fluid ejectors are arranged in a two-dimensional matrix.

* * * * *